United States Patent [19]

Fukuta

[11] Patent Number: 4,858,031
[45] Date of Patent: Aug. 15, 1989

[54] RECORDING APPARATUS AND REGENERATING APPARATUS

[75] Inventor: Yoshihiro Fukuta, Yokohama, Japan

[73] Assignee: Canon Kabushiki Kaisha, Tokyo, Japan

[21] Appl. No.: 64,546

[22] Filed: Jun. 22, 1987

[30] Foreign Application Priority Data

Jun. 26, 1986 [JP] Japan ............... 61-151089

[51] Int. Cl.$^4$ ............................................. H04N 5/781
[52] U.S. Cl. ................................. 358/342; 358/335; 358/906
[58] Field of Search .............. 360/19.1, 14.1, 32, 360/137, 72.2; 369/32, 59, 47–50; 358/342, 335, 341, 343

[56] References Cited

U.S. PATENT DOCUMENTS

| | | | |
|---|---|---|---|
| 4,357,638 | 11/1985 | Yoshimaru et al. | 360/72.2 |
| 4,394,745 | 7/1983 | Menezes et al. | 360/14.1 |
| 4,484,174 | 11/1984 | Wilber et al. | 369/32 |
| 4,528,600 | 7/1985 | Ishiguro et al. | 360/14.1 |
| 4,532,502 | 7/1985 | Menezes et al. | 360/14.1 |
| 4,541,022 | 9/1985 | Katsuyama | 369/59 |
| 4,541,093 | 9/1985 | Furuya et al. | 359/59 |
| 4,573,084 | 2/1986 | Iida | 360/72.2 |
| 4,587,643 | 5/1986 | Monen et al. | 359/32 |
| 4,656,536 | 4/1987 | Furumoto et al. | 350/72.2 |
| 4,682,317 | 7/1987 | Tomisawa | 359/59 |
| 4,691,252 | 9/1987 | Okada et al. | 358/906 |
| 4,694,441 | 9/1987 | Tomisawa et al. | 369/59 |
| 4,707,818 | 11/1987 | Suzuki et al. | 359/59 |
| 4,727,446 | 2/1988 | Kaaden | 360/137 |
| 4,746,993 | 5/1988 | Tada | 358/906 |

*Primary Examiner*—Donald McElheny, Jr.
*Attorney, Agent, or Firm*—Fitzpatrick, Cella Harper & Scinto

[57] ABSTRACT

There is disclosed a recording or reproducing apparatus for recording video or audio signal on a recording medium with plural recording blocks or reproducing video or audio signal from such recording medium, equipped with a display unit for providing a display related to the recording or reproducing operation in the case of video signal recording or reproduction, or the elapsed recording or reproducing time from the start of recording or reproducing operation in the case of audio signal recording or reproduction.

47 Claims, 9 Drawing Sheets

RECORDING APPARATUS AND REGENERATING APPARATUS

BACKGROUND OF THE INVENTION

1. Field of the Invention

The present invention relates to a recording apparatus, and more particularly to a recording apparatus capable of recording a video signal and an audio signal, and a regenerating apparatus capable of regenerating a video signal and an audio signal.

2. Related Background Art

For recording a video signal and an audio signal, there are already known cassette tape recorders and video tape recorders.

Also there has recently been developed a still video system capable of recording a still video signal and an audio signal on a magnetic sheet called a video floppy disk. In such still video system each of concentric tracks formed on the magnetic sheet can record a video signal of a field, or an audio signal of several tens of seconds compressed in time.

In such recording apparatus for recording a video signal and an audio signal, it is necessary, for the user, to be able to know in advance the time available for recording the audio signal, and, also in the course of use, preferable for the user to be able to confirm the remaining recording time. For this purpose the assignee of the present invention has already disclosed, in Japanese Patent Application No. 209311/1985, a technology for displaying the available recording time. Also in recording the video signal, it is desirable to provide a display related to the recording operation, such as the track position utilized for recording the video signal on the magnetic sheet. However, simultaneous display of these two data may not only increase the space required for display, thus leading to an increased cost, but may also cause confusion to the user.

Such drawbacks are also present in the regenerating apparatus.

SUMMARY OF THE INVENTION

A prime object of the present invention is to provide a recording apparatus which is free from the foregoing drawbacks and allows the user to know the time available for audio recording, with a simple structure.

Another object of the present invention is to provide a recording apparatus capable of displaying the time available for audio recording in a readily understandable manner, without the fear of confusion with other displays.

The above-mentioned objects can be achieved, according to a preferred embodiment of the present invention, by a recording apparatus for recording a video signal and an audio signal in the blocks of a recording medium, provided with display means for providing a display related to the recording operation in case of video signal recording, and a display of the elapsed recording time from the start of recording in case of audio signal recording.

In such embodiment, said display means provides a display concerning the recording operation in the case of video signal recording, and a display on the elapsed recording time in the case of audio signal recording.

Still another object of the present invention is to provide a regenerating apparatus allowing the user to know the available time for audio regeneration, with a simple structure.

Still another object of the present invention is to provide a regenerating apparatus capable of displaying the available audio regenerating time in a readily understandable manner, without the fear of confusion with other displays.

The above-mentioned objects can be achieved, according to a preferred embodiment of the present invention, by a regenerating apparatus capable of signal regeneration from a recording medium on which a video signal and an audio signal are recorded in the blocks thereof, provided with display means for providing a display concerning the regenerating operation in the case of video signal regeneration, and a display on the elapsed regenerating time from the start of regeneration in the case of audio signal regeneration.

In such regenerating apparatus, the display means provides a display on the regenerating operation in the case of video signal regeneration, and a display on the elapsed regenerating time in the case of audio signal regeneration.

Still another object of the present invention is to provide an apparatus equiped with display means capable, in recording or reproducing an information signal such as an audio signal in a compressed state with a predetermined compression rate, of displaying the state of such compression in an easily understandable manner.

Still another object of the present invention is to provide a process and means for displaying the audio recording or regenerating time, adapted for use in an audio record/regenerating apparatus meeting the still video standards.

The foregoing and still other objects, features and advantages of the present invention will become fully apparent from the following description of the preferred embodiments.

DESCRIPTION OF THE PREFERRED EMBODIMENTS

Now the present invention will be clarified in detail by embodiments shown in the appended drawings.

Figure 1:
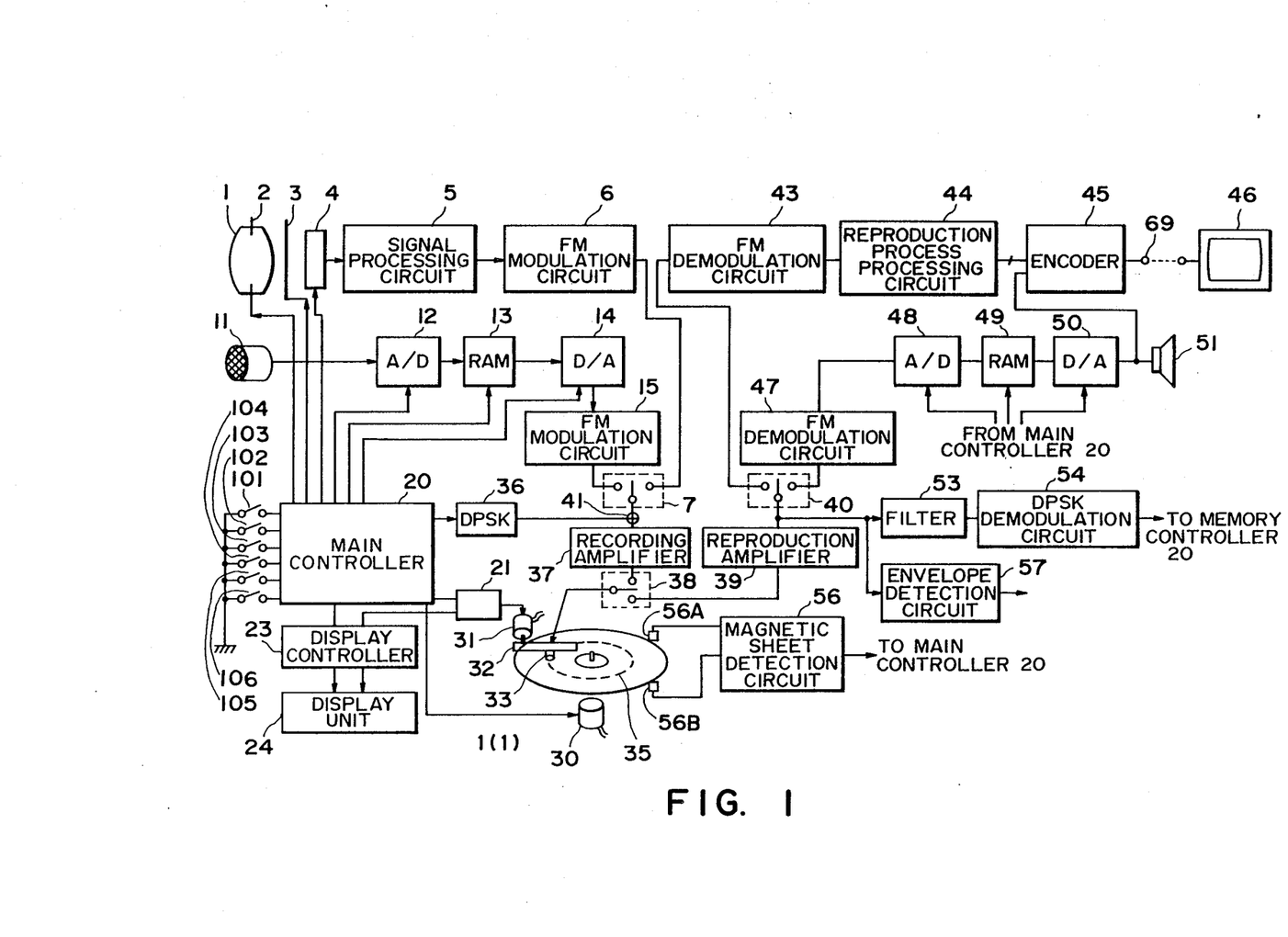
FIG. 1 is a block diagram of an embodiment of the present invention.

In the following description there will be disclosed a record/regenerating apparatus capable of recording and regenerating, according to the still video format, a still video signal or audio signal of several tens of seconds compressed in time axis, on or from one of concentric tracks of a magnetic sheet as explained before, but the present invention is naturally applicable also to other record/regenerating apparatus for recording and regenerating an ordinary video signal or non-compressed audio signal, for example on or from an optical recording medium. Furthermore the present invention is applicable also to an apparatus designed exclusively for recording, or an apparatus designed exclusively for regeneration. FIG. 1 is a block diagram of an embodiment of the present invention, and FIG. 2 is an external perspective view thereof.

Figure 2:
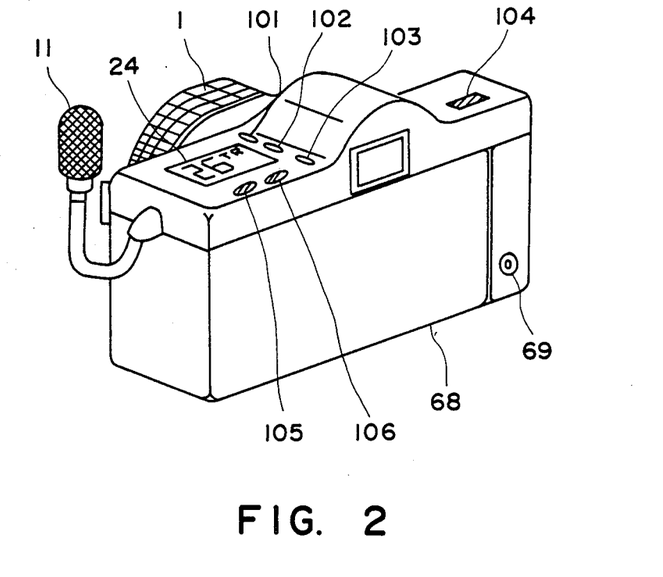
FIG. 2 is an external perspective view of the embodiment shown in FIG. 1.

In FIGS. 1 and 2 there are shown a camera lens 1; a diaphragm 2 thereof; a shutter 3; a solid-state image sensor 4 for photoelectrically converting the light entering from an object through said lens 1, diaphragm 2 and shutter 3; a signal processing circuit 5 for effecting a clamp process, color separation process etc. on the signal from the image sensor 4; an FM modulation circuit 6 for FM modulating the signal processed by said signal processing circuit 5; a switching circuit 7 for selectively supplying a head 33 with the output of said FM modulating circuit 6 or of an FM modulating circuit 15 to be explained later, according to a signal from a main controller 20; a microphone 11 for audio input; a converter 12 for A/D conversion of said audio input; and a RAM 13 for time axis compression of which writing and reading operations are controlled by the main controller 20. The time-axis compression can be achieved by selecting mutually different writing and reading speeds for said RAM 13. Also the level of said compression can be regulated, in the present embodiment, by varying the sampling rate of the A/D converter 12. There are further shown a D/A converter 14 for D/A conversion of the read-out audio data; an FM modulating circuit 15; a switching circuit 7 for the video and audio signals, controlled by the main controller 20; a main controller 20 for controlling the diaphragm 2, the shutter 3, the RAM 13, switching circuits 7, 38, 40, a track position control circuit 21, a display controller 23, a motor 30 and other circuits, according to flow charts to be explained later; and a track position control circuit 21 for controlling the access position of the head 33 by controlling the rotation of a motor 31 according to the instruction from the main controller 20.

Figure 4:
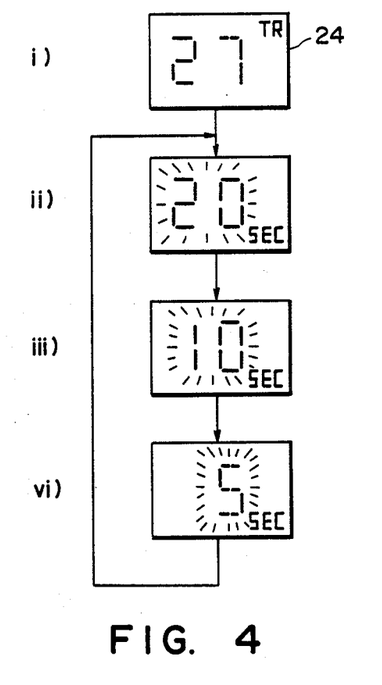
FIG. 4 is a plan view, showing a first display example of a display unit 24 shown in FIG. 1.

There is further shown a display controller 23 which drives a display unit 24, according to a signal from the main controller 20, in such a manner as to provide a display as shown in FIG. 4(i) in the case of video signal recording, or a display as shown in FIG. 4(ii) in the case of audio signal recording.

The display unit 24 is positioned on an upper face of the recording apparatus formed as a camera.

There are further shown a motor 30 for rotating a magnetic sheet 34; a motor 31 driven by the track position control circuit 21; a rack 32 engaging with a gear of the motor 31; a head 33 mounted on said rack 32, for recording the signal entered from the switching circuits 7, 38 on the magnetic sheet 34; a track 35 formed on the magnetic sheet 34; a differential phase shift keying (DPSK) circuit 36 for multiplex recording, with the video or audio signal to be recorded, of an ID signal which is released by the main controller 20 and which indicates the video or audio signal recording and the level of time-axis compression in case of audio signal recording; a recording amplifier 37 for amplifying the FM modulated signal for supply to the head 33; a switching circuit 38 for connecting either the recording amplifier 37 or a regenerating amplifier 39 to the head 33; a regenerating amplifier 39 for amplifying the signal regenerated by the head 33; a selector switch 40 for supplying the output of said regenerating amplifier 39 either to an A/D converter 48 in case of audio signal regeneration, or to an FM demodulating circuit 43 in case of video signal regeneration; an adder 41 for adding the signal to be recorded and the output of the DPSK circuit 36; an FM demodulating circuit 43 for FM demodulation of the signal regenerated by the regenerating amplifier 39; a regeneration process circuit 44 for effecting a clamping process etc. on the FM demodulated signal; an encoder 45 for converting the signal after regeneration process into a complex television signal such as NTSC signal; a monitor 46 for displaying the signal from the encoder 45; an FM demodulating circuit for FM demodulation of the output of the regenerating amplifier 47; a converter 48 for A/D conversion of the FM demodulated signal; a RAM 49 for storing the A/D converted signal; and a converter 50 for D/A conversion of the signal read from the RAM 49 by the main controller 20, with a time-axis expansion achieved by mutually different writing and reading speeds.

There are further shown a loudspeaker 51 for acoustic regeneration of the signal converted by the D/A converter 50; a filter 53 filtering the signal modulated by the DPSK circuit 36 and overlapped with the signal regenerated by the regenerating amplifier 39; a demodulating circuit 54 for DPSK demodulation of the output of said filter 53; a magnetic sheet detecting circuit 56 for detecting the presence of a magnetic sheet from the output of a photocoupler 56A, 56B; an envelope detecting circuit 57 for discriminating whether the track of the magnetic sheet 34 is already recorded so that the head 33 provides a regeneration output; and a cover openable for inserting the magnetic sheet 34.

There are further shown an external terminal 69 for example for releasing the signal regenerated from the magnetic sheet 34; a record/regeneration mode selector switch 101 for selecting the recording mode in the closed state or the regenerating mode in the open state; an audio/video mode selector switch 102 for example for selecting an audio signal recording mode in the closed state or a video signal recording mode in the open state; and an audio compression rate switch 103 for cyclically select the audio compression rate or the sampling rate of the A/D converter 12. An actuation of said switch 13 in the audio recording mode changes the display of the display unit 24 from the indication of a track number shown in FIG. 4(i) to a display of the available audio recording time shown in FIG. 4(ii), and successive actuations of said switch 103 cyclically change the display in the order of (ii), (iii), (iv) and (ii) shown in FIG. 4.

A release switch 104 has two strokes, and, when depressed to the second stroke, serves as a trigger switch in the recording mode, and as a switch for starting and stopping the regeneration in the regenerating mode.

An UP switch 105 moves the head 33 by a track toward the inside of the magnetic sheet, while a DOWN switch 106 moves said head 33 by a track toward the outside of the magnetic sheet.

Figure 3A:
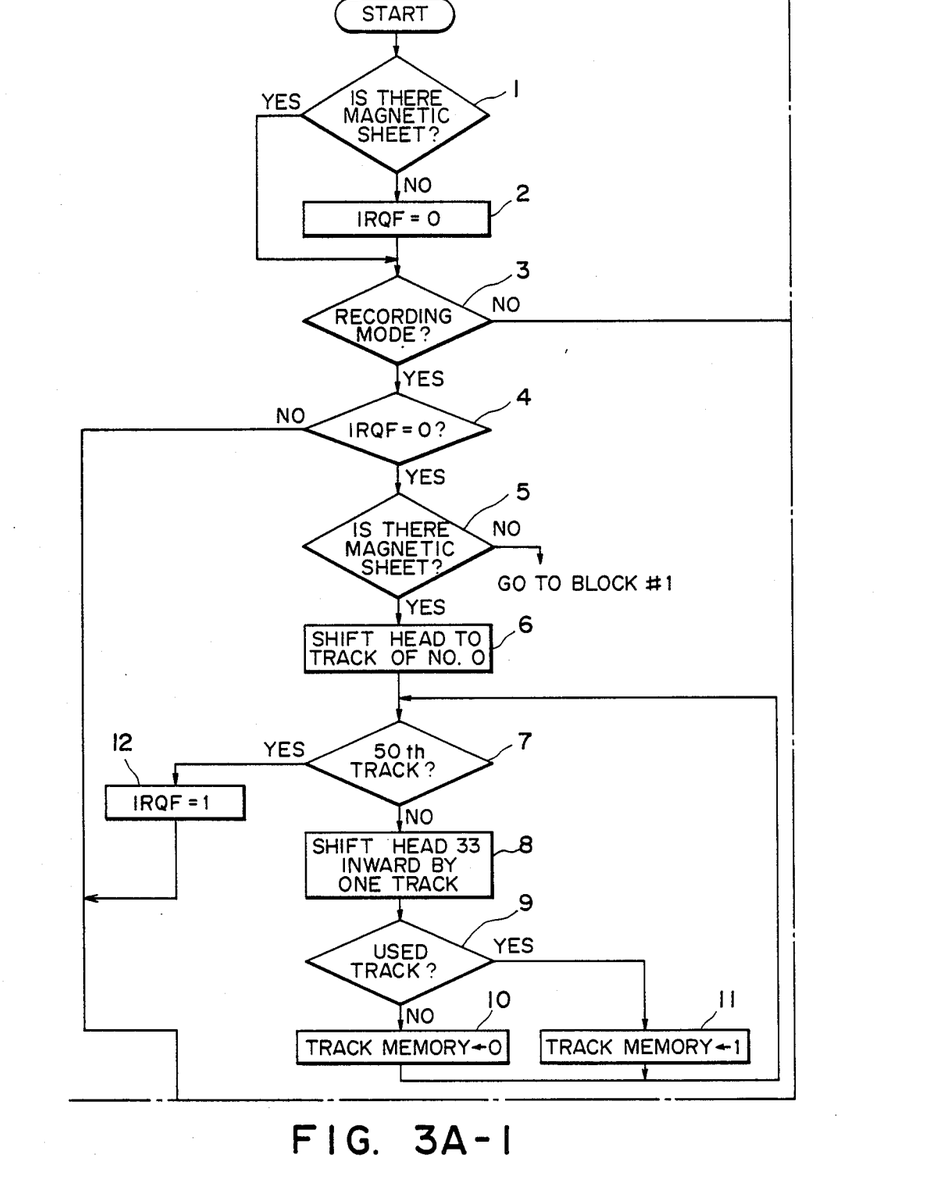
Figure 3A:
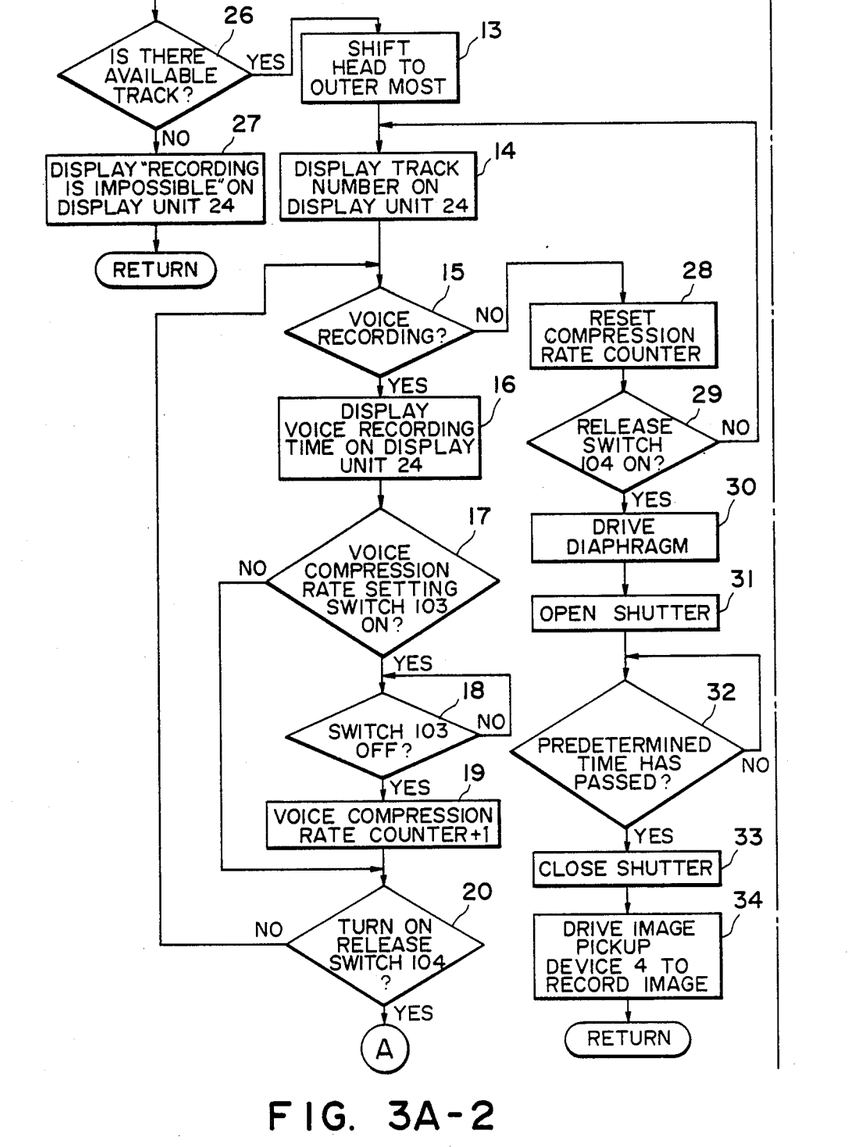
Figure 3A:
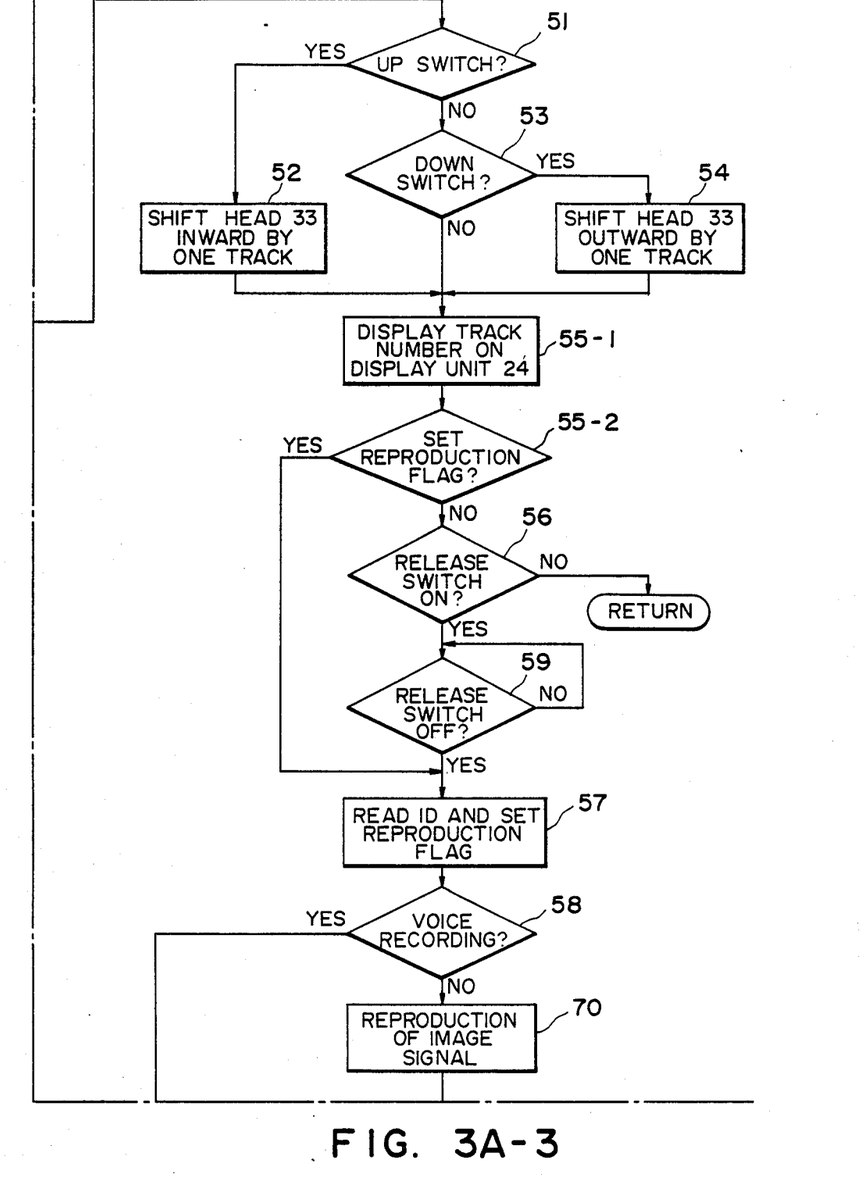
Figure 3A:
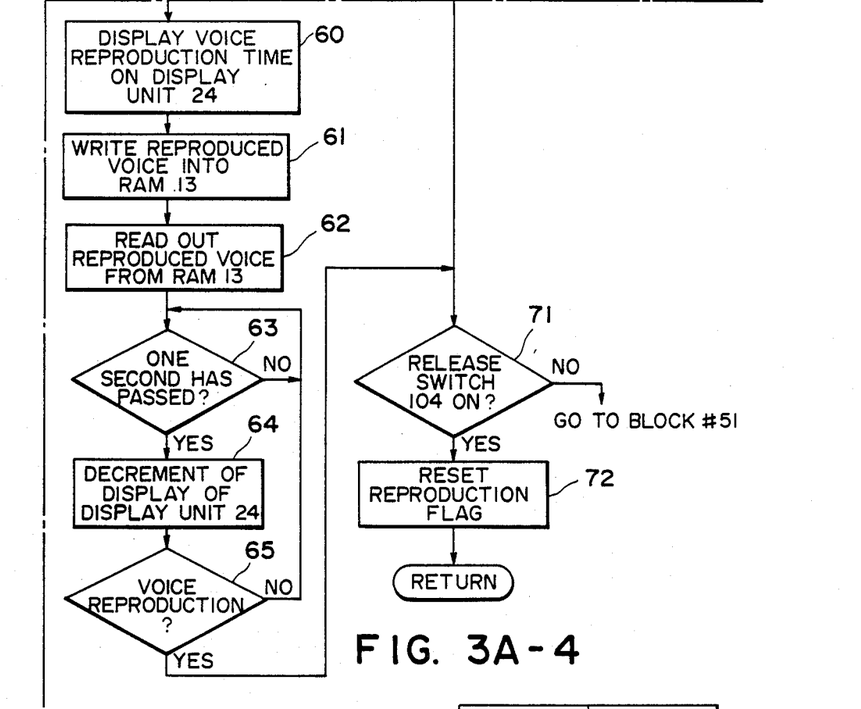
Figure 3A:
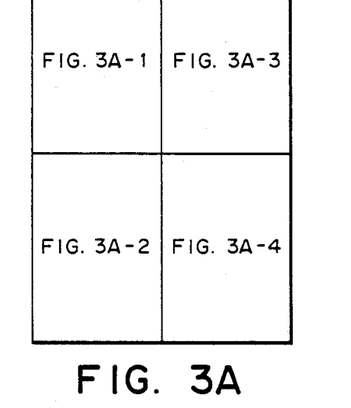
FIGS. 3A (consisting of FIGS. 3A-1, 3A-2, 3A-3 and 3A-4) and 3B are flow charts showing the function of a main controller 20 shown in FIG. 1.
Figure 3B:
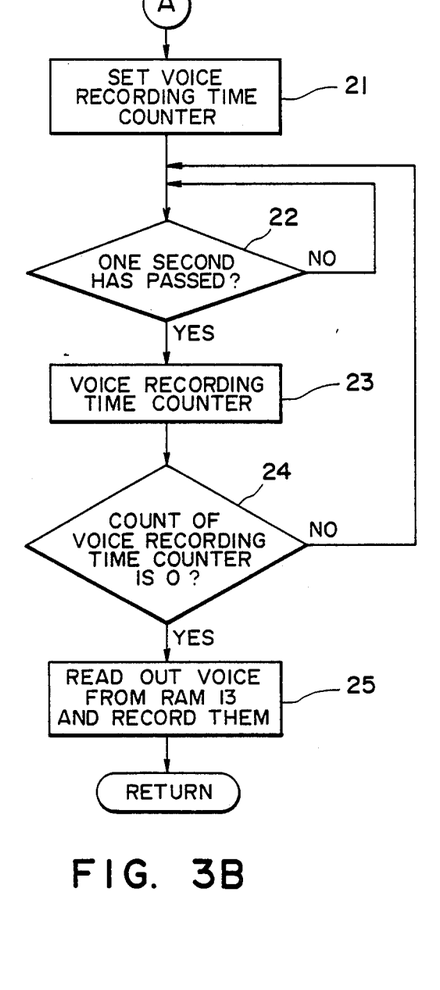

Now reference is made to FIGS. 3A and 3B which are flow charts of the control sequence of the main controller 20 shown in FIG. 1, in order to explain the function of the above-explained embodiment of the present invention.

In the following is explained each step in said flow charts:

1: When the release switch 104, shown in FIG. 2, is depressed to the first stroke, the output of the magnetic sheet detecting circuit 56 is discriminated, and the program proceeds to a step #2 if the magnetic sheet is absent, or to a step #3 if said sheet is present, with the activation of the motor 30.

2: Initialize reset flag (IRQF) is reset to zero.

3: The state of the switch 101 is checked to identify the recording mode or the regenerating mode, and the program proceeds to a step #4 or #51 respectively.

4: There is made discrimination whether the flag IRQF is set, and the program proceeds to a step #26 or #5 respectively if said flag is set or not.

5: The output of the magnetic sheet detecting circuit 56 is checked, and the program proceeds to a step #1 or #34 respectively when the magnetic sheet 34 is absent or present.

6: The motor 31 is driven through the track position control circuit 21 in such a manner that the head 33 makes access to the 0-th track (a position outside of the 1st track by one track pitch).

7: Discrimination is made whether the head 33 is at the 50th track or not, and the program proceeds to a step #12 or #8.

8: This step is executed when the step #7 identifies that the head 33 is not positioned at the 50th track, and the head 33 is displaced inwards by a track.

9: Discrimination is made whether the track on which the head 33 is positioned is already recorded, by switching the switching circuit 38 to the regenerating amplifier 39, effecting the regenerating operation for a short period and detecting the output of the envelope detecting circuit 57.

10: If the step #9 identifies that said track is not yet recorded, a bit of a track memory corresponding to the number of the track where the head 33 is positioned is shifted to "0". For example, if the head 33 is positioned at the 10th track, a 10th bit of the track memory provided in the main controller 20 is shifted to "0".

11: If the step #9 identifies that said track is already recorded, a bit of the track memory corresponding to the track number where the head 33 is positioned is shifted to "1".

12: If the step #7 identifies that the head 33 is positioned at the 50th track, the recorded or non-recorded state of all the tracks on the magnetic sheet 34 is recorded in the track memory. Thus the flag IRQF is set and the program proceeds to a step #26. Said identification is made by the track position control circuit 21.

26: If all the bits of the track memory are "1", indicating the absence of empty track, the flow proceeds to a step #27. On the other hand, if an empty track is available, the flow proceeds to a step #13.

27: A mark, for example "PP" flashes on the display unit 24 through the display controller 23, thus indicating that the recording operation is not possible.

13: The head 33 is moved to the outermost empty track on the magnetic sheet 34.

14: The display unit 24 is controlled through the display controller 23 so as to display the number of the track where the head 33 is positioned.

15: The state of the switch 102 is detected to identify the audio recording mode or the video recording mode, and the flow proceeds to a step #16 or #28 respectively.

16: In case of the audio recording mode, the display unit 24 displays for example the available audio recording time as shown in FIG. 4(ii), instead of the track number. In this state the display controller 23 is so driven as the display on the display unit 24 to flash intermittently, indicating that the audio compression rate is regulable.

17: Discrimination is made as to whether the audio compression rate setting switch 103 is turned on or not, and the flow proceeds respectively to a step #18 or #20.

18: Discrimination is made as to whether the switch 103, identified as turned on in the step #17, is turned off, namely whether the operating finger has left said switch 103, and, if affirmative, the flow proceeds to a step #19.

19: The count of the audio compression rate counter is increased by one.

The count of the audio compression rate counter is related with the display of the display unit 24 in the following manner.

Said counter is composed of a ring counter, of which count is stepwise increased and returns from "2" to "0" in response to each actuation of the audio compression rate setting switch 103. A count "0", "1" or "2" respectively provides a display as shown in FIG. 4(ii), (iii) or (iv).

The state shown in FIG. 4(ii) indicates that the audio time-compression rate is 1280 times and that the available audio recording time is 20 seconds, while the state in FIG. 4(iii) indicates that the audio time-compression rate is 640 times with the available audio recording time of 10 seconds, and the state in FIG. 4(iv) indicates that the audio time-compression rate is 320 times, with the available audio recording time of 5 seconds. A signal indicating said time-compression rate is recorded on the track in the form of the aforementioned ID signal, and the writing and reading speeds of the RAM's 13, 49 are controlled according to said time-compression rate.

20: Discrimination is made as to whether the release switch 104 is depressed to the second stroke or not, and the flow proceeds respectively to a step #21 or #15.

21: A count corresponding to the compression rate selected in the steps #16 to #20 is preset in the audio recording time counter. Said preset value is same as that displayed on the display unit 24.

22: It is discriminated whether one second has elapsed. This step is repeated until the lapse of one second, after which the flow proceeds to a step #23.

23: The count of the audio recording time counter is stepwise decreased. The display controller 23 controls the display unit 24 so as to display the count of the audio recording time counter. Thus, in response to the depression of the release switch over the second stroke, the display unit 24 indicates the available remaining time for audio recording. The display on the display unit 24 flashes in the selection of the audio compression rate in the steps #16–#19, but it is continuously lighted when the release switch 104 is turned on, thus indicating that the audio recording is proceeding.

24: It is discriminated whether the count of the audio recording time counter is "0" or not, and the flow respectively proceeds to a step #25 or returns to the step #22.

25: The switch 7 is connected to the FM modulating circuit 15 while the switch 38 is connected to the head 33. The audio signal stored in the RAM 13 is read at a high speed in such a manner that the audio signal stored in said RAM 13 can be recorded in one track, or that all the signal in the RAM 13 is read during one rotation of the magnetic sheet, and the time-compressed audio signal is recorded on the magnetic sheet 34.

In this step, a bit of the track memory corresponding to the track subjected to recording operation is shifted to "1".

The foregoing is the procedure when the audio recording mode is selected by the switch 102. In the following there will be explained the procedure when the video recording mode is selected by the switch 102.

28: The audio compression rate counter is reset.

29: In response to the detection that the release switch 104 has been depressed to the second stroke, the flow proceeds to a step #30, and, in absence of said detection the flow returns to the step #14.

30: The diaphragm 2 is closed to a predetermined stop value according to the output of an unrepresented light measuring circuit.

31: The shutter 3 is opened for a predetermined period to expose the image sensor 4 to the incoming light.

32: There is discriminated whether an exposure time, determined from the output of said unrepresented light measuring circuit and the stop value of the diaphragm set in the step #30, and, after the lapse of said exposure time, the flow proceeds to a step #33.

33: The shutter 3 is closed.

34: The switch 7 is connected to the FM modulating circuit 6 while the switch 38 is connected to the head 33, and the image sensor 4 is activated to obtain photoelectrically converted signal, whereby the signal processed in the processing circuit 5, and FM modulated in the FM modulating circuit 6 is recorded by the head 33 on the magnetic sheet 34. In this step there is set a bit of the track memory corresponding to the track subjected to the recording operation.

In the above-explained recording modes, the display unit 24 indicates the available audio recording time when the audio recording mode is selected by the switches 101, 102, and the display on said display unit 24 flashes when the audio compression rate is regulable with the switch 103. Once the audio recording operation is started, the display unit 24 indicates the remaining available time for audio recording according to the time elapsed.

In the video recording mode, the display unit 24 indicates the number of the track on which the head 33 is positioned.

Figure 5:
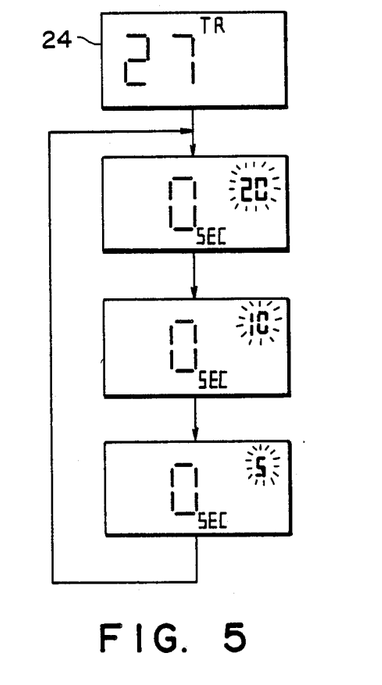
FIG. 5 is a plan view, showing a second display example of the display unit 24.

In the present embodiment, a single display unit is utilized for indicating the number of the track where the head 33 is positioned, the available audio recording time, and the data corresponding to the audio compression rate. However, it is also possible to construct the display unit 24 as shown in FIG. 5, so that the available audio recording time and the number of track where the head 33 is positioned are indicated by a single display unit while the data corresponding to the audio compression rate is displayed by another display unit.

The foregoing explains the procedure executed when the recording mode is selected by the record/regeneration mode selector switch 101. In the following there will be explained a procedure, branching from the step #3 and starting from a step #51, when the regenerating mode is selected by said switch 101.

51: When the regenerating mode is set, there is discriminated whether the UP switch 105 is turned on or not, and the flow proceeds respectively to a step #52 or #53.

52: The head 33 is shifted inwards by a track.

53: There is discriminated whether the DOWN switch 106 is turned on or not, and the flow proceeds respectively to a step #54 or #56.

54: The head 33 is shifted by a track outwards.

55-1: The display unit 24 is so controlled as to display the track number.

55-2: There is discriminated whether a regeneration flag is set or not, and the flow proceeds respectively to a step #57 or #56.

56: There is discriminated whether the release switch 104 has been depressed to the second stroke. The flow returns to the start if said second stroke depression has not been made. If said depression has been made, a step #59 detects that said depression has been released, and the flow then proceeds to a step #57.

57: The selector switch 38 is connected to the regenerating amplifier 39, and the demodulated ID signal is read by the filter 53 and the DPSK demodulating circuit 54. Also there is set a regeneration flag which is to be discriminated in a step #55-2.

58: From the ID signal read in the step #57, there is discriminated whether audio signal recording has been made or not, and the flow proceeds respectively to a step #60 or #70.

60: The display unit 24 is so controlled as to display the regenerating time according to the audio compression rate regenerated from said ID signal. There will be given a display, for example, as shown in FIG. 4(ii), (iii) or (iv) respectively for a compression rate of 1280 times, 640 times or 320 times.

61: The switch 40 is connected to the FM demodulating circuit 47 to provide the signal regenerated by the head 33 to said circuit 47 and to store the regenerated audio signal in the RAM 13. The time required for said storage corresponds to the one cycle time of the magnetic sheet 34 and is very short in fact.

62: The reading of the signal, stored in the RAM 13 in the step #61, is started with a speed corresponding to the audio compression rate, thereby regenerating the audio signal by the loudspeaker 51 or the monitor 46 through the D/A converter 50.

63: The reading of the signal, stored in the RAM 13, is continued, and the lapse of one second is discriminated, and the flow proceeds to a step #64 after the lapse of one second.

64: The display on the display unit 24 is decreased stepwise, thus indicating the remaining regenerating time of the audio signal.

65: There is discriminated whether the signal reading from the RAM 13 has been completed or not, and the flow proceeds respectively to a step #71 or returns to the step #63. Then, if the step #71 identifies that the second stroke depression of the release switch 104 has not been made, the flow returns to the step #51. The reading and writing operations of the RAM 49 are controlled by the main controller 20, and the completion of signal reading is identified by the state of a read-out control counter provided in the main controller 20.

If the step #58 does not identify the audio recording operation, there is executed a flow starting from a following step #70:

70: The selector switch 40 is shifted to the FM demodulating circuit 43. The signal regenerated by the head 33 is demodulated in said FM demodulating circuit 43, then processed in the regeneration process circuit 44, converted into a complex television signal by the encoder 45, and supplied to the monitor 46 connected to the external monitor terminals 69, for regeneration of the image.

71: There is discriminated whether the release switch 104 has been turned on again, and, if not, the flow returns to the step #51 to repeat the above-explained procedure. Once the regenerating operation is started, the steps #56 and #59 are not executed, since the regeneration flag is set in the step #57. Thus, after said setting of the regeneration flag, the access position of the head 33 can be arbitrarily changed by the UP switch 105 or DOWN switch 106.

72: If the release switch 104 is depressed to the second stroke, the regeneration flag is reset to interrupt the regenerating operation, and the flow returns to the start.

In the above-explained embodiment, the regenerating operation is started by the depression of the release switch 104 to the second stroke after the selection of the regenerating mode by the switch 101. The ID signal detected from the output of the head 33, of which access position is controlled by the UP switch 105 and the DOWN switch 106, is used for discriminating whether the track where the head 33 is positioned record video signal or audio signal, and the display unit 24 provides different displays according to the result of said discrimination. If audio signal is recorded, a display corresponding to the compression rate of said signal is given on the display unit 24.

Also in the regeneration of audio signal, the remaining regenerating time is automatically displayed with the progress of the audio regeneration.

Furthermore, in said embodiment, the lapse of audio recording time in the recording mode and the lapse of audio regenerating time in the regenerating mode are both displayed by the remaining time on a same display unit, but it is naturally possible also to represent the elapsed time of recording or regeneration. In essence, any mode of display capable of indicating the lapse of time is acceptable.

Figure 6:
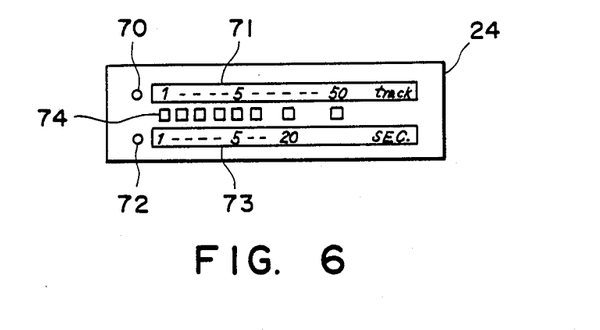
FIG. 6 is a plan view, showing a third display example of the display unit 24.

Also in said embodiment the display unit 24 is composed of seven-segment display elements of two digits, but it is also possible, as shown in FIG. 6, to construct the display unit 24 from scales 71, 73, display elements 74 such as light-emitting diodes, and display elements 70, 72 for indicating either of said scales. In this structure, in case of the audio recording or regenerating mode, the display element 72 is turned on, and the display elements 74 are turned on in succession from a position corresponding to an index "1" on the scale 73, or are all turned on at the beginning and are turned off in succession from a position "1" to a position "20", with the progress of the audio recording or regeneration. In the video recording or regeneration, the display element 70 is turned on, and a display element 74 is turned on, corresponding to an index 71 of a track number where the head 33 is positioned.

Figure 7:
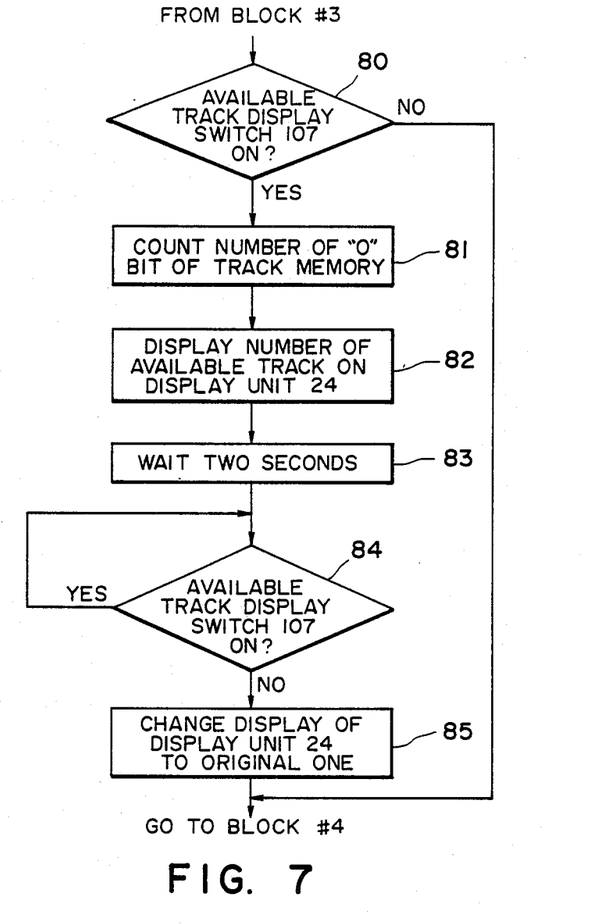
FIG. 7 is a flow chart illustrating another embodiment of the present invention.

Also in said embodiment the elapsed time of audio recording or regeneration, the track number of video recording or regeneration, and the disabled recording state are indicated by the display unit 24, but it is also possible to provide a switch 107, connected to the main controller 20, for displaying the number of empty tracks and to execute a sequence shown in FIG. 7 when said switch is turned on.

In the following there will be explained a flow shown in FIG. 7, which is to be inserted between the steps #3 and #4 shown in FIG. 3A and is to be executed only when the recording mode is selected by the switch 101. In order to display the number of empty tracks also in the regenerating mode, the flow shown in FIG. 7 may be inserted between the steps #2 and #3 shown in FIG. 3A:

80: Determine whether or not the empty track display switch 107 is turned on. In case of that it is determined that the switch is turned on, then go to the step #81. In case of not, then go to step #4.

81: When the empty track display switch 107 is turned on, there is counted the number of unrecorded tracks, represented by the "0" bits in the track memory of the controller 20.

Figure 8:
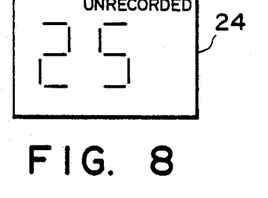
FIGS. 8 and 9 are plan views showing other display examples of the display unit 24 in the execution of the sequence shown in FIG. 7.
Figure 9:
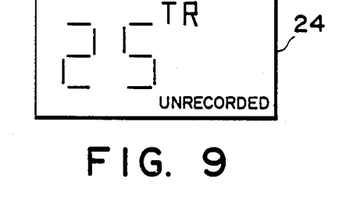

82: The number of empty tracks counted in the step #81 is displayed on the display unit 24. Respectively corresponding to the display format shown in FIG. 4 or FIG. 5, there will be provided a display shown in FIG. 8 or FIG. 9, together with a message "unrecorded", signifying that the displayed number indicates the number of empty tracks.

83: The flow waits for 2 seconds, in order to continue the display executed in the step #82.

84: There is discriminated whether the empty track display switch 107 is turned on or not, and this step is repeated if said switch is turned on. If said switch is turned off, the flow proceeds to a step #85.

85: The display on the display unit 24 is shifted to the display state in the step #3.

The embodiment of the flow shown in FIG. 7 allows one further to simplify the structure of the display unit 24, since the display of the number of empty tracks and the display of the elapsed recording or regenerating time are both made on the display unit 24.

In the foregoing embodiments the display unit 24 is used for multiple purposes, and there are employed additional messages such as "TR", "SEC", "UN-RECORDED" shown in FIGS. 4, 5, 8 and 9 or additional scales 71, 73 shown in FIG. 6 for indicating the nature of displayed information, but it is also possible to modify the format of display for this purpose, for example by employing different colors or modifying the positions of displayed data.

Also in the foregoing embodiments of FIGS. 4 and 5, the display is flashing in the setting of the audio compression rate but is continuous in the audio recording operation in order to distinguish these two states, but such distinguishing can be achieved also through a modification in the display format.

As explained in the foregoing, the embodiment of the present invention provides a recording apparatus allowing the user to know the lapse of time in audio recording with display of a simple structure without the fear of confusion.

Also the embodiment of the present invention provides a recording apparatus allowing the user to know the lapse of time in audio regeneration with display of a simple structure, without the fear of confusion.

What is claimed is:

1. A recording apparatus capable of recording video signal or audio signal in each memory block of a memory means, comprising:
    (a) recording means for recording a video signal or an audio signal in the memory means;
    (b) switch means for selecting audio signal recording or video signal recording to be performed by said recording means;
    (c) display means for displaying numerical data; and (d) control means for controlling display of data by said display means, wherein said control means controls said display means such that said display means displays elapsed time as numerical data when audio signal recording is selected by said switch means and displays information related to recording operation of said recording means when video signal recording is selected by said switch means.

2. A recording apparatus according to claim 1, wherein said display means displays the number of a memory block of said memory means, at which the recording is conducted by said recording means.

3. A recording apparatus according to claim 1, wherein the memory means is a recording medium.

4. A recording apparatus according to claim 3, wherein the recording medium is disk-shaped.

5. A recording apparatus according to claim 3, wherein said number of memory block is the number of a track formed on the recording medium.

6. A recording apparatus according to claim 1, wherein said recording means includes:
first means for processing, for recording, the video signal to be recorded; and
second means for processing, for recording, the audio signal to be recorded.

7. A recording apparatus according to claim 1, wherein said display means includes seven-segment display devices.

8. A recording apparatus according to claim 1, further comprising means for measuring the elapsed recording time from the start of recording of the audio signal.

9. A recording apparatus according to claim 1, further comprising means for counting the number of unrecorded blocks from among the memory blocks of the memory means.

10. A recording apparatus according to claim 9, wherein said display means displays the number of unrecorded memory blocks obtained by said counting means.

11. A recording apparatus capable of recording information signal in each memory block of a memory means, said apparatus comprising:
(a) recording means for recording the information signal in each block of the memory means;
(b) means for counting elapsed recording time of the information signal;
(c) display means for displaying numerical data;
(d) instructing means for instructing said recording means to start recording of the information signal; and
(e) control means for controlling display of data by said display means, wherein said control means controls said display means such that said display means displays elapsed recording time of said information signal after start of recording of said information signal is instructed by said instructing means and displays a number of recording block accessed by said recording means when start of recording of the information signal is not instructed by said instructing means.

12. A recording apparatus according to claim 11, wherein the memory means is a recording medium.

13. A recording apparatus according to claim 12, wherein the recording medium is disk-shaped.

14. A recording apparatus according to claim 12, wherein said number of memory block is the number of a track formed on the recording medium.

15. A recording apparatus according to claim 11, wherein said display means includes seven-segment display devices.

16. A recording apparatus according to claim 11, wherein the information signal is an audio signal, and wherein said recording means is means for recording the audio signal with time-axis compression in each block of the memory means.

17. A recording apparatus comprising:
(a) means for compressing an information signal;
(b) means for setting the compressing state of said compressing means;
(c) display means for displaying numerical data; and
(d) control means for controlling display of data by said display means, wherein said control means controls said display means such that said display means displays information related to the compressing state set by said setting means when setting of the compressing state is performed by said setting means and displays information other than information related to the compressing state when the compressing state is not set by said setting means.

18. A recording apparatus according to claim 17, wherein said compressing means is means for time-axis compression of the information signal.

19. A recording apparatus according to claim 18, wherein said setting means is means for setting the time-axis compression rate of said compressing means.

20. A recording apparatus according to claim 17, wherein said display means includes seven-segment display devices.

21. A recording apparatus according to claim 17, further comprising:
(e) means for recording the information signal, compressed by said compressing means, in memory means provided with plural memory blocks,
wherein said control means is adapted to cause said display means to display the number of a block in which said recording means is to effect a recording operation.

22. A recording apparatus according to claim 17, further comprising:
(e) recording means for recording the information signal, compressed by said compressing means, in a memory means provided with plural memory blocks; and
(f) means for counting the number of unrecorded memory blocks from among the plural memory blocks of the memory means,
wherein said control means is adapted to cause said display means to display the number of unrecorded memory blocks counted by said counting means.

23. A recording apparatus according to claim 17, wherein said setting means is adapted to set the compression rate of said compressing means in plural levels.

24. A recording apparatus capable of recording an information signal with time-axis compression in each memory block of a memory means, said apparatus comprising:
(a) means for time-axis compression of the information signal;
(b) setting means for setting the time-axis compression of said time-axis compressing means;

(c) recording means for recording the information, after it has been subjected to time-axis compression by said time-axis compressing means, in a memory block under access;
(d) display means adapted for displaying numerical data; and
(e) control means for controlling display of data by said display means, wherein said control means controls said display means such that said display means displays the time-axis compressing state set to said display means when such time-axis compressing state is set by said setting means, and displays information other than such time-axis compressing state when the time-axis compressing state is not set by said setting means.

25. A recording apparatus according to claim 24, wherein the memory means is a recording medium.

26. A recording apparatus according to claim 25, wherein said recording means further comprises:
a recording head with variable access position to the recording medium; and
means for supplying said recording head with the information signal compressed by said time-axis compressing means.

27. A recording apparatus according to claim 24, wherein said display means displays information of a memory block number of the memory means.

28. A recording apparatus capable of recording an audio signal in each memory block of a memory means, said apparatus comprising:
(a) recording means for recording the audio signal in each block of the memory means;
(b) first means for counting the elapsed recording time of the audio signal;
(c) second means for counting the number of unrecorded blocks from among the memory blocks of the memory means;
(d) display means for displaying numerical data;
(e) instructing means for instructing said recording means to start recording of the audio signal; and
(f) control means for controlling display of data by said display means, wherein said control means controls said display means such that said display means displays information related to elapsed recording time counted by said first means after start of recording of the audio signal, and displays information related to a number of unrecorded memory blocks when recording of the audio signal has not been instructed by said instructing means.

29. A recording apparatus according to claim 28, wherein the memory means is a recording medium.

30. A recording apparatus according to claim 28, further comprising designation means for designating, to said display means, the display of the number of unrecorded memory blocks counted by said second means.

31. A reproducing apparatus capable of reproducing a video signal or an audio signal recorded in each of plural memory blocks of a memory means, said apparatus comprising:
(a) reproducing means for reproducing the video signal or the audio signal from the memory means;
(b) switch means for selecting audio signal reproduction or video signal reproduction to be performed by said reproducing means;
(c) display means for displaying numerical data; and
(d) control means for controlling display of data by said display means, wherein said control means controls said display means such that said display means displays elapsed time as numerical data when audio signal reproducing is selected by said switch means and displays information related to reproducing operation of said reproducing means when video signal reproducing is selected by said switch means.

32. A reproducing apparatus according to claim 31, wherein said display means displays the number of a memory block of the memory means, at which the reproduction is conducted by said reproducing means.

33. A reproducing apparatus according to claim 31, wherein the memory means is a recording medium.

34. A reproducing apparatus according to claim 33, wherein the recording medium is disk-shaped.

35. A reproducing apparatus according to claim 33, wherein said number of memory block is the number of a track formed on the recording medium.

36. A reproducing apparatus according to claim 31, wherein said reproducing means includes:
first means for reproduction-processing the recorded video signal; and
second means for reproduction-processing the recorded audio signal.

37. A reproducing apparatus according to claim 31, wherein said display means includes seven-segment display devices.

38. A reproducing apparatus according to claim 31, further comprising means for measuring the elapsed reproducing time from the start of reproduction of the audio signal.

39. A reproducing apparatus according to claim 31, further comprising means for counting the number of unrecorded blocks from among in the memory blocks of said memory means.

40. A reproducing apparatus according to claim 39, wherein said display means displays the number of unrecorded memory blocks obtained by said counting means.

41. A reproducing apparatus for reproducing a compressed information signal with signal expansion, said apparatus comprising:
(a) means for identifying the compression rate of the compressed information signal;
(b) display means for displaying numerical data; and
(c) control means for controlling said display means such that said display means displays information according to the compression rate identified by said identifying means when the compression rate can be identified by said identifying means and displays information other than information according to the compression rate when said identifying means cannot identify the compression rate.

42. A reproducing apparatus according to claim 41, further comprising reproducing means for reproducing said information signal, recorded in compressed state in memory means provided with plural memory blocks;
wherein said control means is adapted to cause said display means to display the number of a block to which said reproducing means is making access for reproduction.

43. A reproducing apparatus according to claim 41, wherein the information signal is a time-axis compressed information signal.

44. A reproducing apparatus according to claim 43, wherein the information signal is an audio signal.

45. A reproducing apparatus according to claim 44, wherein said information according to the compression rate is information indicating the reproducing time in a case in which the audio signal is expanded.

46. A reproducing apparatus according to claim 41, wherein said display means includes seven-segment display devices.

47. A reproducing apparatus according to claim 41, further comprising:

(d) reproducing means for reproducing the information signal, recorded in compressed state in a memory means provided with plural memory blocks; and (e) means for detecting unrecorded blocks from among the plural memory blocks of the memory means;

wherein said control means is adapted to cause said display means to display information related to the unrecorded blocks detected by said detecting means.

* * * * *

UNITED STATES PATENT AND TRADEMARK OFFICE
CERTIFICATE OF CORRECTION

PATENT NO. : 4,858,031
DATED : August 15, 1989
INVENTOR(S) : YOSHIHIRO FUKUTA, ET AL.

Page 1 of 2

It is certified that error appears in the above-identified patent and that said Letters Patent is hereby corrected as shown below:

On the title page
IN [56] REFERENCES CITED

U.S. PATENT DOCUMENTS, "4,357,638  11/1985 Yoshimaru et al." should read --4,357,638  11/1982 Yoshimaru et al.--.

Attorney, Agent, or Firm, "Fitzpatrick, Cella Harper & Scinto" should read --Fitzpatrick, Cella, Harper & Scinto--.

COLUMN 2

Line 24, "equiped" should read --equipped--.

COLUMN 4

Line 47, "select" should read --selecting--.
    Line 49, "switch 13" should read --switch 103--.

COLUMN 9

Line 25, "positioned record" should read --positioned contains a record--.

COLUMN 10

Line 8, "of" should be deleted.
    Line 10, "of" should be deleted.

UNITED STATES PATENT AND TRADEMARK OFFICE
CERTIFICATE OF CORRECTION

PATENT NO. : 4,858,031

DATED : August 15, 1989

INVENTOR(S) : YOSHIHIRO FUKUTA, ET AL.

Page 2 of 2

It is certified that error appears in the above-identified patent and that said Letters Patent is hereby corrected as shown below:

COLUMN 14

Line 34, "in" should be deleted.

Signed and Sealed this

Twenty-eighth Day of August, 1990

*Attest:*

HARRY F. MANBECK, JR.

*Attesting Officer*　　　　*Commissioner of Patents and Trademarks*